Figure 1:
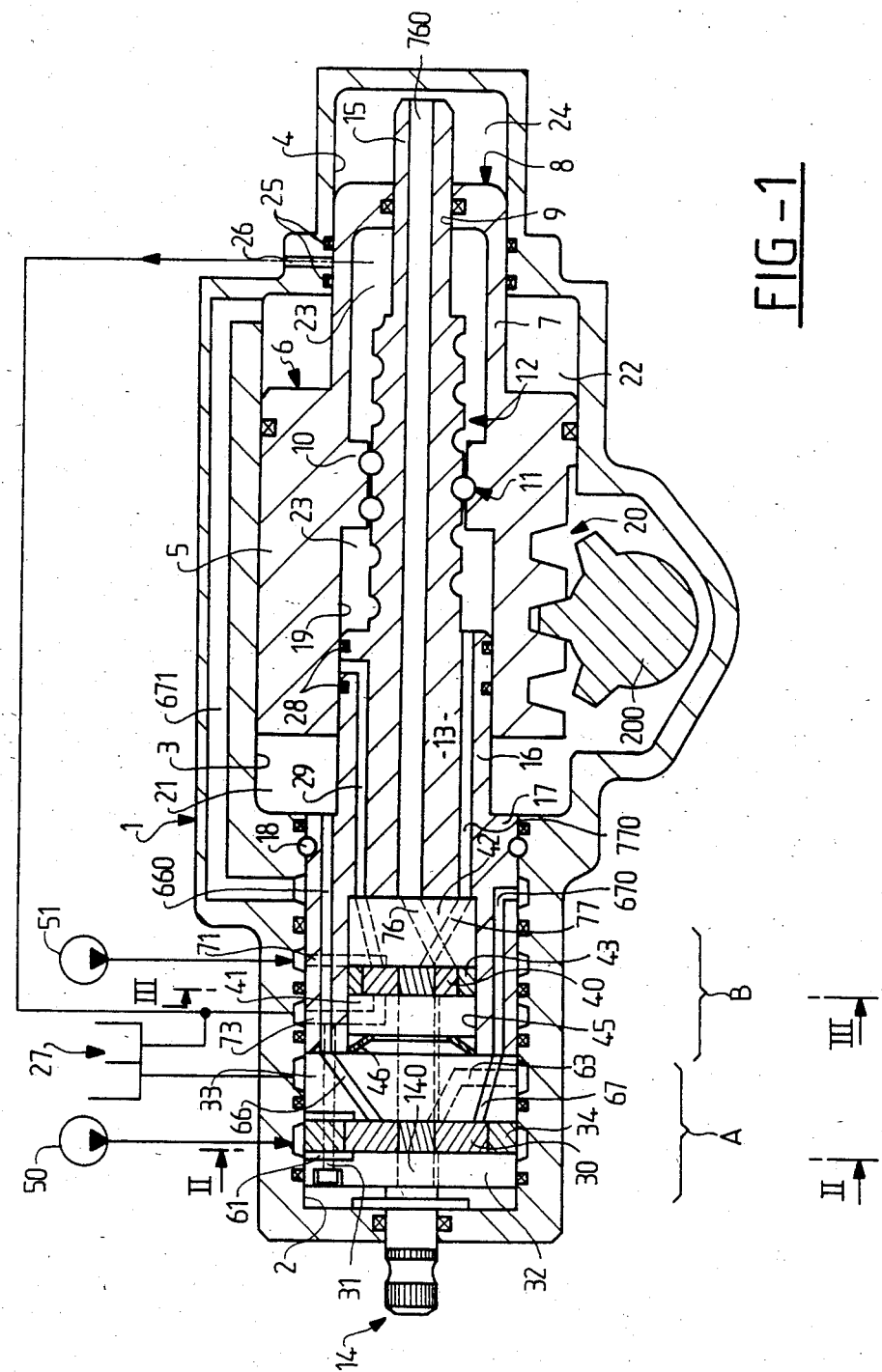

United States Patent [19]

Bacardit

[11] Patent Number: 4,598,629
[45] Date of Patent: Jul. 8, 1986

[54] COMPACT ASSISTED STEERING MECHANISM

[75] Inventor: Juan S. Bacardit, Barcelona, Spain

[73] Assignee: Bendiberica, S.A., Barcelona, Spain

[21] Appl. No.: 741,496

[22] Filed: Jun. 5, 1985

[30] Foreign Application Priority Data

Jun. 27, 1984 [ES] Spain ............................ 533.744

[51] Int. Cl.$^4$ ............................................. F15B 13/06
[52] U.S. Cl. ........................................ 91/519; 60/425; 91/524; 180/152
[58] Field of Search ............... 74/388 PS; 60/425, 426; 91/380, 519, 524, 520; 180/132, 133, 148, 152, 153

[56] References Cited

U.S. PATENT DOCUMENTS

| | | | |
|---|---|---|---|
| 3,817,152 | 6/1974 | Viron | 91/519 X |
| 3,848,693 | 11/1974 | Sheppard | 180/133 |
| 4,186,818 | 2/1980 | Jablonsky | 180/133 |
| 4,296,677 | 10/1981 | Little et al. | 91/510 |
| 4,382,483 | 5/1983 | Spencer | 180/153 |
| 4,458,580 | 7/1984 | Masuda et al. | 91/375 R |

Primary Examiner—Margaret A. Focarino
Assistant Examiner—Allen J. Flanigan
Attorney, Agent, or Firm—Larry J. Palguta; Ken C. Decker

[57] ABSTRACT

Two pistons (5, 8) are mounted in the same casing (1) so as to slide in a sealed manner, the two pistons (5, 8) being firmly fixed to one another and having corresponding actuating chambers (21, 22; 23, 24) which are separated from one another and are supplied sequentially by two distribution valves (A, B) which are situated in the casing (1) and are actuated by the input shaft (14). The second piston (8) is formed by an extension (7) of the first piston (5) and its corresponding actuating chambers (22, 24) are formed in the piston structure (5, 8) and by a housing (4) in the casing (1), respectively, the housing (4) being coaxial with the main housing (3) for the first piston (5). The two valves (A, B) are advantageously of the type having a star-shaped rotor (30, 40).

12 Claims, 5 Drawing Figures

COMPACT ASSISTED STEERING MECHANISM

The present invention concerns assisted steering mechanisms, particularly for motor vehicles, of the type incorporating a casing, a first piston sliding in a sealed manner in a first cylindrical housing of the casing and defining a first pair of opposed actuating chambers, the first piston incorporating internally a nut means co-operating with a spindle which incorporates a threaded portion and is joined to an input shaft of the mechanism, and externally, a rack means meshing with an output pinion of the mechanism, supported so as to rotate in the casing, and a first pair of passage means in the casing so as to supply selectively the chambers of the first pair of chambers with fluid under pressure.

Such an assisted steering mechanism is particularly described in the document U.S. Pat. No. 4,128,046, in the name of the Applicant Company, and incorporates a double-acting piston arranged in the casing so as to assist, in either direction of actuation, the force transmitted from the input shaft to the output pinion, which is itself typically connected to a linkage mechanism for steering the steerable wheels of the vehicle.

The need has recently arisen, particularly for reasons of driving comfort and economy of energy, to provide modulation of the assistance as a function of certain conditions of use and of motion of the vehicle. It is thus being proposed to put into operation selectively two assistance pistons, controllable separately or simultaneously. Such systems are particularly described in the documents U.S. Pat. Nos. 3,602,326 and 4,186,818. In the latter document, the assisted steering system incorporates a compact mechanism of the general type described above in greater detail, together with an assistance cylinder outside the casing of the compact mechanism. This arrangement requires special coupling of the external assistance cylinder to the linkage mechanism for steering the wheels as well as additional pipe work for supplying this external assistance cylinder, which considerably complicates installation in a vehicle and increases the costs of manufacture and mounting, and also introduces additional risk of failure.

The aim of the present invention is to propose a double acting assisted steering mechanism, which is of compact configuration, is robust, and does not require special modifications of the vehicle which is intended to be equipped with such a mechanism, in which a second assistance piston, coupled to the first assistance piston, is also situated in the casing of the mechanism.

To achieve this, according to a characteristic of the invention, the assisted steering mechanism incorporates a second piston, joined mechanically to the first piston and sliding in a sealed manner in a second cylindrical housing of the casing, coaxial to the first housing, and defining a second pair of opposed actuating chambers separated in a sealed manner from the chambers of the first pair of chambers, and a second pair of passage means, inside the casing, distinct from the passages of the first pair of passage means, so as to supply selectively the chambers of the second pair of chambers.

Another aim of the present invention is to propose a compact assisted steering mechanism as defined above, which is of particularly compact construction, is of modular design, whose mounting costs are reduced, and which offers wide versatility, in which a double distribution valve means is also situated in the casing of the mechanism.

To achieve this, according to a characteristic of the invention, the mechanism incorporates a distribution valve means, to which the first and second pairs of passage means are connected, which is capable of being actuated by the input shaft and which incorporates a first and a second rotary valve which are coaxial with the input shaft, which are situated in tandem and are joined to the first and second pairs of passage means, respectively, the rotary valves each being advantageously of the type with a flat star-shaped rotor.

Figure 2:
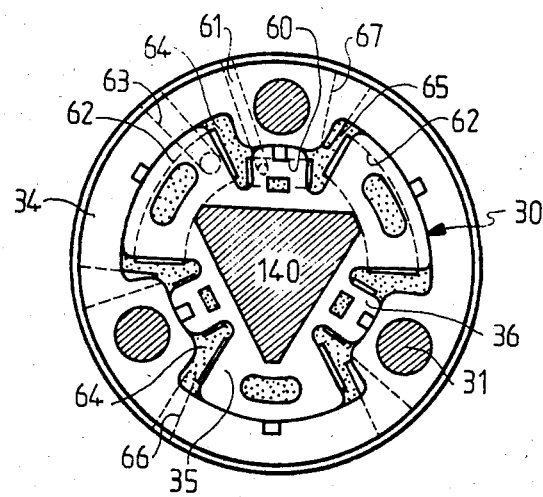
Figure 3:
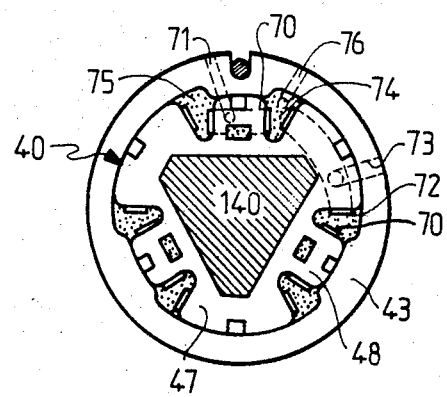
Figure 4:
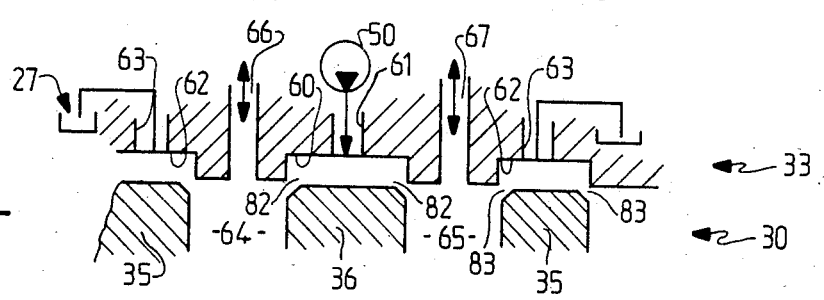
Figure 5:
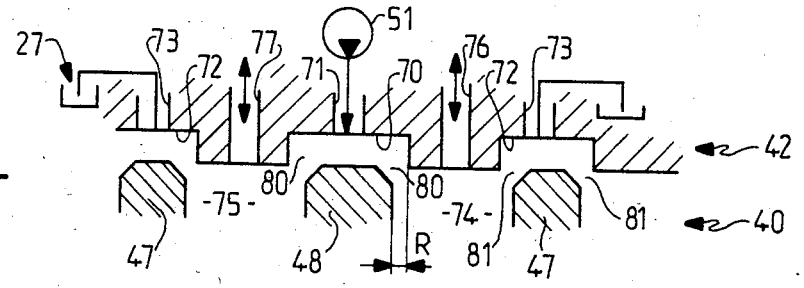

Other characteristics and advantages of the present invention will emerge from the following description of an embodiment, given by way of illustration but not limiting in any way, with reference to the accompanying drawings, in which:

FIG. 1 is a diagrammatic view in longitudinal section of a compact assisted steering mechanism according to the invention;

FIGS. 2 and 3 are partial views of the rotary valves sectioned through the planes II—II and III—III; and FIGS. 4 and 5 are diagrammatic developed views of the rotary valves shown in FIGS. 2 and 3 showing the arrangement of fluid circulation circuits in the latter.

The compact assisted steering mechanism shown in FIG. 1 incorporates a casing, given the general reference 1, in which are formed in succession (from left to right in FIG. 1), a first end bore 2, a central bore of greater diameter 3 and a second end bore of reduced diameter 4, the central bore 3 communicating with both the end bores 2 and 4. A first piston 5 of a piston structure, given the general reference 6, is mounted in the central bore 3 sliding in a sealed manner, the piston structure 6 incorporating an annular end extension of smaller diameter 7 which is housed sliding in a sealed manner in the second end bore 4 and incorporating a frontal end wall forming a second piston 8 provided with a central bore 9. The piston structure 6 incorporates internally, in the region of the first piston 5, a central portion of reduced diameter 10 forming a circulation ball nut 11 which cooperates with an intermediate threaded portion 12 of a central longitudinal spindle 13 which is capable of being actuated in rotation in the casing by an input shaft 14 of the mechanism which is intended to be connected to the steering wheel of a motor vehicle.

According to a feature of the invention, the spindle 13 incorporates an end of reduced diameter 15 extending and sliding in a sealed manner through the bore 9 of the second piston 8, an intermediate portion of larger diameter with smooth peripheral surface 16 on the same side as the threaded portion 12 remote from the end extension 15, and an end portion of still larger diameter 17 remote from the end extension 15, rotatably mounted in a sealed manner in the first end bore 2 of the casing 1 while being immobilized axially by a ball race 18. The intermediate portion of enlarged diameter 16 is housed slidingly in a sealed manner in a central bore 19 of the first piston 5. The latter incorporates in a conventional manner, on a portion of its periphery, a straight rack portion 20 co-operating in mesh with an output pinion 200 which is mounted so as to rotate in the casing 1 and which is typically intended to be connected to a linkage mechanism for steering the steerable wheels of the vehicle (not shown).

It will be understood that in the arrangement described above, the first piston 5 defines, with the spindle 13, in the central bore 3, a first pair of annular chambers 21 and 22, while the second piston 8 defines, with the spindle 13 and the casing 1, two opposed chambers of a second pair of chambers, namely an internal annular chamber 23, on each side of the central nut portion 10, defined at its other end by the intermediate portion of enlarged diameter 16 of the spindle 13, and an end chamber 24 also defined, in the end bore 4, by the bottom of the casing closing this bore 4, the various chambers being isolated from one another. As shown in FIG. 1, the end extension 7 of the piston structure 6, is preferably sealed relative to the bore 4 by a pair of annular seals 25, carried in the casing 1, thus separating in a sealed manner the chamber 22 from the chamber 24, and between which a compensating passage 26 is situated, which is intended to be connected to a reservoir 27, as will be seen in due course. In a similar way, the bore 19 of the first piston 5 is sealed relative to the intermediate portion 16 of the spindle 13 by means of a pair of seals 28, thus isolating the chambers 21 and 23 from one another, and between which a compensating passage 29 is situated, which is intended to be connected to the reservoir 27.

According to a feature of the invention, the mechanism incorporates a twin distribution valve means consisting of a first distribution valve assembly A and a second distribution valve assembly B situated in tandem in the casing 1 and capable of being actuated in sequence by the input shaft 14. The two distribution valve assemblies A and B may be of the type with a cylindrical rotor and a peripheral sleeve which is also cylindrical of the type described in the document U.S. Pat. No. 4,128,046 mentioned above. However, for improved axial compactness of the mechanism, each distribution valve assembly A and B is preferably of the type with a flat star-shaped rotor such as described particularly in the documents U.S. Pat. Nos. 4,217,932 and 4,320,780, in the name of the Applicant Company, the contents of which are assumed to be attached herewith for reference.

In accordance with the teachings of the two latter documents, the first rotary distribution valve assembly A incorporates, as is also shown in FIG. 2, a star-shaped rotor 30, mounted rotating in a sealed manner in an internal chamber of a stator consisting of the assembly, by means of screws such as 31, of two annular end components 32 and 33 and an annular spacer 34. In a similar way, the second rotary distribution valve assembly B incorporates a star-shaped rotor mounted rotating in a sealed manner in an annular cavity of a stator consisting of a stack of two annular end components 41 and 42 and an annular spacer 43. According to a feature of the invention, the stator of the first valve assembly A is mounted so as to rotate in the first end bore 2 of the casing 1 while the stator of the second valve assembly B is housed in a bore 45 of the end portion of larger diameter 17 of the spindle 13, the constituent components (41, 42, 43) of this stator being held against one another by an elastic washer 46 interposed between the end component 33 of the stator of the first valve assembly A and the adjacent end component 41 of the stator of the second valve assembly B. The rotors 30 and 40 are firmly fixed without angular play to a triangular extension portion 140 of the input shaft 14, passing with angular play through corresponding central openings in the end components 32, 33 and 41, 42 of the valve assemblies A and B.

In the embodiment shown, the first valve assembly A, or primary valve, is a hydraulic reaction valve with a star-shaped rotor, whereas the second valve assembly B, or secondary valve, is a valve with a star-shaped rotor, essentially without hydraulic reaction. As a variant, both valve assemblies may be of the type without hydraulic reaction but, at least for the first valve assembly, with reaction provided by a pair of C-shaped springs, as described in the document No. EP-A-0,077,710 in the name of the Applicant Company. Whatever particular form of construction is utilized for the valves with star-shaped rotor, the arms of the star-shaped rotors define, in a known manner, variable restrictions with openings formed in the surfaces facing the end components of the stator as a function of the relationship of the rotor relative to the stator, allowing selective distribution towards appropriate circuits supplying a modulated pressure coming from a source of pressure normally flowing through the distribution valve towards a reservoir 27. In the arrangement according to the present invention, a first source of pressure or pump 50 is associated with the first valve assembly A, while a second source of pressure or pump 51 is associated with the second valve assembly B, the second course of pressure 51 typically being of smaller capacity than the first source of pressure 50, or as an option, operating in an intermittent manner as a function of operating parameters of the vehicle. In the embodiment shown, the rotor 30 of the first valve assembly A incorporates three main arms 35, providing the hydraulic reaction, and three short arms 36 essentially providing the distribution of fluid under pressure by co-operating with inlet openings 60 of the stator which are joined to the source of pressure 50 by supply passages 61, the edges of the main arms 35 co-operating with openings 62 of the stator which are connected to the reservoir 27 by passages 63. A pair of distribution chambers 64 and 65 is defined between each short arm 36 and the adjacent main arms 35, the distribution chambers 64 and 65 being connected through passages 66 and 67, respectively, formed in the component of the stator 33, and through corresponding passages 660 and 670 formed in the end portion of enlarged diameter 17 of the spindle 13 to the chambers 21 and 22 of the first piston 5, the passage 670 of the opposing chamber 22 being extended by a passage 671 formed in the body of the casing 1. In a similar way, the rotor 40 of the second valve assembly B incorporates main arms 47 and short arms 48. The latter co-operate with inlet openings 70 which are connected by passages 71 to the source of pressure 51, the main arms 47 co-operating with outlet openings 72 which are connected to the reservoir 27 by passages 73. The distribution chambers 74 and 75 of the secondary valve assembly B are connected by passages 76 and 77 formed in the stator component 42 and communicating with passages 760 and 770 formed in the spindle 13, to the chambers 24 and 23, respectively, of the second piston 8.

As shown in FIGS. 4 and 5, in order to provide sequential operation of the two valves A and B, that is to say, in practice, in order to actuate the secondary valve B only after substantial rotation of the inlet shaft 14, corresponding for example to conditions such as parking of the vehicle, the arms 36 and 35 and the corresponding cavities 60 and 62 of the first valve assembly A are dimensioned relative to the arms 48 and 47 and the corresponding cavities 70 and 72 of the second valve assembly B in such a way that the distribution restrictions 80 (together with the discharge control restrictions 81) of the second valve assembly B are greater by a value R than the corresponding restrictions 82 and 83 of the first valve assembly A which are put into operation immediately for each rotation of the input shaft 14 so that, apart from these parking maneuvers or when taking sharp bends, the assistance is effected essentially by the first piston 5, whose chambers 21 and 22 are supplied from the first pressure source 50, the second piston 8, whose chambers 23 and 24 are supplied from the second source of pressure 51 of reduced capacity, intervening only occasionally to supplement the assistance provided by the first piston 5. As a variant, in order to provide sequential operation of the valve assemblies A and B, a lost motion coupling may be provided between the input shaft 140 and the rotor 40 of the second valve assembly.

Although the present invention is described above in relation to a particular embodiment, the invention is not limited by it but on the contrary is capable of modifications and variants which will be apparent to a person versed in the art.

I claim:

1. Compact assisted steering mechanism, incorporating a casing (1), a first piston (5) sliding in a sealed manner in a first cylindrical housing (3) of the casing and defining a first pair of opposed actuating chambers (21, 23), the first piston incorporating internally nut means (10) co-operating with a spindle (13) incorporating a threaded portion (12) and connected to an input shaft (14) of the mechanism, and externally, rack means (20) meshing with an output pinion (200) of the mechanism supported so as to rotate in the casing (1), and a first pair of passage means (660; 670, 671), in the casing to supply selectively the chambers of the first pair of chambers with fluid under pressure, characterized in that the mechanism incorporates a second piston (8), connected mechanically to the first piston (5) and sliding in a sealed manner in a second cylindrical housing (4) of the casing (1), which is coaxial with the first housing (3), and defining a second pair of opposed actuating chambers (23, 24) separated in a sealed manner from the chambers (21, 22) of the first pair of chambers, and a second pair of passage means (760, 770), in the casing, distinct from the first pair of passage means to supply selectively the chambers of the second pair of chambers with fluid under pressure.

2. Mechanism according to claim 1, characterized in that the second piston (8) is annular and slides internally in a sealed manner on a smooth cylindrical end extension (15) of the spindle (13), the second pair of passage means (760, 770) being formed in the spindle (13).

3. Mechanism according to claim 2, characterized in that the first piston (5) slides internally in a sealed manner upon a smooth cylindrical intermediate zone of enlarged diameter (16) of the spindle (13) remote from the end extension (15) relative to the threaded portion (12) of the spindle.

4. Mechanism according to claim 2 characterized in that the second piston (8) consists of a tubular end extension (7) of the first piston (5) remote from the input shaft (14), the second housing (4) of the casing (1) being axially spaced from the first housing (3) of the casing.

5. Mechanism according to claim 4, characterized in that the end extension (15) of the spindle (13) has a reduced diameter relative to the threaded portion (12), the second housing (4) of the casing (1) having a diameter which is less than that of the first housing (3).

6. Mechanism according to claim 2, characterized in that the mechanism incorporates distribution valve means (A, B) situated in the casing (1), capable of being actuated by the input shaft (14) and communicating with the passages of the first and second pairs of passage means.

7. Mechanism according to claim 6, characterized in that the distribution valve means incorporates a first rotary valve (A) and a second rotary valve (B) which are coaxial with the input shaft (14), which are situated in tandem and are connected to the first and second pairs of passage means, respectively.

8. Mechanism according to claim 7, characterized in that the first rotary valve (A) and the second rotary valve (B) are both of the type having a flat star-shaped rotor (30, 40).

9. Mechanism according to claim 8, characterized in that the first valve (A) is situated in a bore (2) of the casing (1), the second valve (B) being situated in a bore (45) in an end of enlarged diameter (17) of the spindle (13) which is mounted so as to rotate in the bore (2) of the casing.

10. Mechanism according to claim 9, characterized in that the first pair of passage means (660, 670) are formed at least partially in the end of enlarged diameter (17) of the spindle (13).

11. Mechanism according to claim 7, characterized in that the mechanism incorporates means for connecting each valve (A, B) to an associated source of presssure (50, 51).

12. Mechanism according to claim 11, characterized in that the sources of pressure (50, 51) are pumps of different capacities.

* * * * *